United States Patent
Takayama

(10) Patent No.: US 9,083,882 B2
(45) Date of Patent: Jul. 14, 2015

(54) IMAGE CAPTURE APPARATUS AND METHOD FOR CONTROLLING THE SAME

(71) Applicant: Canon Kabushiki Kaisha, Tokyo (JP)

(72) Inventor: Kazunori Takayama, Hachioji (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/166,157

(22) Filed: Jan. 28, 2014

(65) Prior Publication Data
US 2014/0232886 A1    Aug. 21, 2014

(30) Foreign Application Priority Data

Feb. 19, 2013    (JP) .................................. 2013-030409

(51) Int. Cl.
*H04N 5/228*    (2006.01)
*G03B 17/00*    (2006.01)
*H04N 5/232*    (2006.01)

(52) U.S. Cl.
CPC ................................ *H04N 5/23254* (2013.01)

(58) Field of Classification Search
CPC .......... H04N 5/23248; H04N 5/23258; H04N 5/23254; H04N 5/23287; H04N 5/23264; H04N 5/23267; G03B 5/00; G03B 27/646
USPC .............................. 348/208.1–208.99; 396/55
See application file for complete search history.

(56) References Cited

U.S. PATENT DOCUMENTS

2010/0215353 A1 *    8/2010    Hashi et al. ...................... 396/55
2012/0320227 A1 *    12/2012   Tsuchida ................. 348/208.99

FOREIGN PATENT DOCUMENTS

JP    2008-005084 A    1/2008
JP    2011-145604 A    7/2011

* cited by examiner

*Primary Examiner* — Tuan Ho
*Assistant Examiner* — Selam Gebriel
(74) *Attorney, Agent, or Firm* — Cowan, Liebowitz & Latman, P.C.

(57) ABSTRACT

An offset corresponding to an amount of geometric deformation is added to an amount of drive of an optical member due to an optical image shake correction so that the center of a reference area necessary for geometric deformation processing comes closer to the center of an imaging area. Because of this, a possibility is increased that a reference area necessary for geometric deformation processing is fully contained in an imaging area, and blurring of an image due to a motion of an image capture apparatus is effectively corrected by combining an optical image shake correction and a geometric deformation process.

6 Claims, 9 Drawing Sheets

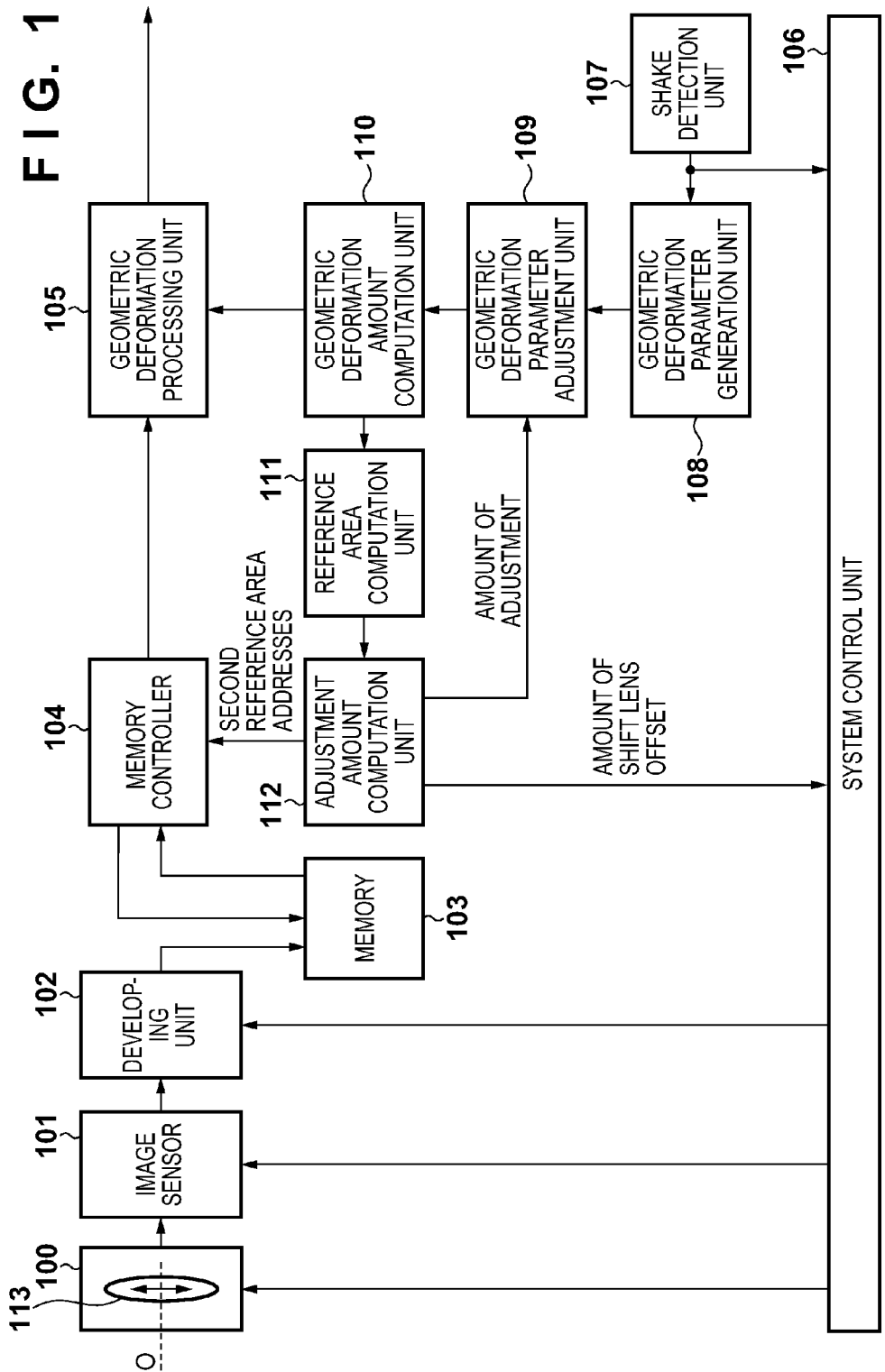

IMAGE CAPTURE APPARATUS AND METHOD FOR CONTROLLING THE SAME

BACKGROUND OF THE INVENTION

1. Field of the Invention

The present invention relates to an image capture apparatus and a method for controlling the same, and in particular, to image shake correction technique for suppressing image shake caused by a motion of an image capture apparatus, such as camera shake.

2. Description of the Related Art

Conventionally, so-called image shake correction functions are known that correct (mitigate) blurring (image shake) of a captured image caused by a motion of an image capture apparatus, and optical image shake correction and electronic image shake correction are typical methods for realizing image shake correction functions (see Japanese Patent Laid-Open No. 2011-145604). Optical image shake correction is a method for suppressing a motion of an object image by a moving optical member such as a shift lens or an image sensor, based on a detected amount of shake of an image capture apparatus. In addition, electronic image shake correction is a method for suppressing a motion of an object image by setting an area of effective pixels smaller than an area of recordable pixels, and shifting the position of the area of effective pixels based on a detected amount of shake of an image capture apparatus.

In addition, rotational direction components such as yaw, pitch, and roll due to a rotation (a rotational shake) of an image capture apparatus may be included in blurring (image shake) of a captured image caused by a motion of the image capture apparatus, in addition to parallel movement (translational direction) components that are correctable by an image shake correction method described in Japanese Patent Laid-Open No. 2011-145604. Moreover, a technique for correcting image shake due to rotational direction components of a shake by applying a geometric deformation process to a captured image is disclosed in Japanese Patent Laid-Open No. 2008-5084.

For example, it is conceivable that image shake due to rotational direction components of a shake is corrected using the geometric deformation process disclosed in Japanese Patent Laid-Open No. 2008-5084, after correcting image shake due to translational direction components of a shake using the image shake correction technique disclosed in Japanese Patent Laid-Open No. 2011-145604.

In geometric deformation processing of an image as disclosed in Japanese Patent Laid-Open No. 2008-5084, it is necessary to refer to other pixel values in order to generate corrected pixel values. An area made up of the referred pixels is referred to as a reference area. If the necessary reference area is not included in the imaging area (captured image), it is impossible to correctly perform a correction requiring the reference area, and in some cases, a part of the corrected image is missing.

Therefore, if a geometric deformation process is performed on an image that has been subjected to correction of image shake due to translational direction components of a shake, it is possible that a reference area necessary for the geometric deformation process is not included in the imaging area (area of a captured image held in a memory), and that a part of the corrected image is missing.

A case will be described with reference to FIGS. 11A and 11B where a geometric deformation process is performed on an image that has been subjected to correction of image shake due to translational direction components of a shake.

In FIG. 11A, an entire area 1100 is an area of the entire captured image (for example, the entire captured image held in a memory of an image capture apparatus). A reference area 1101 is a reference area necessary for a geometric deformation process for correcting rotational direction components of a shake. In addition, an area 1102 represents the area within the reference area 1101 that is not included in the captured image 1100. An area 1103 represents a rectangular area circumscribing the reference area 1101.

In FIG. 11B, an image 1104 is an image subjected to a geometric deformation process using the reference area 1101. P1 in FIG. 11A represents the center position of an object image, and P2 in FIG. 11B represents a position obtained by converting the pixel at the position of P1 by geometric deformation processing. P2 is located in the center (the point where the diagonals intersect) of the image after geometric deformation.

Conventional optical image shake corrections have not been intended for a geometric deformation process after image shake correction. Because of this, corrections have been performed without regard to the magnitude of rotational direction components of a shake such that an object image and an imaging area of an image sensor maintain a predetermined positional relationship (for example, a state in which the centers of an object image and an imaging area correspond to each other). However, the center of the rectangular area 1103 circumscribing the reference area 1101 that is necessary to correct a distortion generated in an object image due to rotational direction components of a shake such as tilting does not necessarily coincide with the center of an imaging area. Thus, there has been a case where an ability to correct image shake due to rotational direction components of a shake by geometric deformation processing is not effective when capturing an image in an imaging area larger than a record size.

For example, in an example in FIG. 11A, if P1 is shifted in a top right direction, the reference area 1101 (and the rectangular area 1103) is (are) fully contained in the captured image, and no part of the corrected image is missing even if a geometric deformation process making use of the reference area 1101 is performed. However, in conventional optical image shake corrections, since optical members are controlled so that the position of P1 does not change, there has been the area 1102 in which the reference area 1101 is not fully contained in a captured image.

SUMMARY OF THE INVENTION

The present invention has been made in view of such problems of the conventional art, and it is an objective to provide an image capture apparatus and a method for controlling the same that can effectively correct blurring (image shake) of an image due to a motion of the image capture apparatus by combining an optical image shake correction and a geometric deformation process.

According to an aspect of the present invention, there is provided an image capture apparatus comprising: a detection unit which detects a motion in a translational direction and a rotational direction of the apparatus; a shake correction unit which mitigates image shake of a captured image due to the motion in the translational direction by driving an optical member; and a geometric deformation processing unit which corrects a distortion of the captured image due to a detected motion in the rotational direction by applying a geometric deformation process to the captured image, wherein the geometric deformation processing unit corrects the distortion in an output image area that is smaller than an imaging area of the captured image by applying to the output image area the geometric deformation process using pixels of a reference area of the captured image that is necessary to correct the distortion, and wherein the shake correction unit drives the optical member based on an amount of drive corrected so that a center of a rectangular area corresponding to the reference area comes closer to a center of the imaging area.

According to a further aspect of the present invention, there is provided a method for controlling an image capture apparatus comprising: a detection step of detecting a motion in a translational direction and a rotational direction of the apparatus; a shake correction step of mitigating image shake of a captured image due to a motion in the translational direction by driving an optical member; and a geometric deformation processing step of correcting a distortion of the captured image due to a detected motion in the rotational direction by applying a geometric deformation process to the captured image, wherein in the geometric deformation processing step, the distortion in an output image area that is smaller than an imaging area of the captured image is corrected by applying to the output image area the geometric deformation process using pixels of a reference area necessary to correct the distortion, and wherein in the shake correction step, the optical member is driven based on an amount of drive corrected so that a center of a rectangular area corresponding to the reference area comes closer to a center of the imaging area.

Further features of the present invention will become apparent from the following description of exemplary embodiments with reference to the attached drawings.

BRIEF DESCRIPTION OF THE DRAWINGS

FIG. 1 is a block diagram showing a functional configuration example of a digital camera serving as one example of an image processing apparatus according to a first embodiment of the present invention.

DESCRIPTION OF THE EMBODIMENTS

Figure 2A:
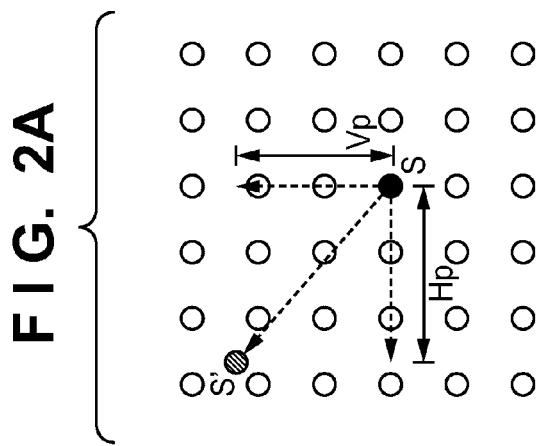
FIGS. 2A through 2C are schematic views illustrating an operation of a geometric deformation processing unit in FIG. 1.

Exemplary embodiments of the present invention will now be described in detail in accordance with the accompanying drawings.

(First Embodiment)

FIG. 1 is a block diagram showing a functional configuration example of a digital camera serving as one example of an image processing apparatus according to a first embodiment of the present invention. In the present embodiment, although a case will be described where an optical member for realizing optical image shake corrections is a shift lens, the embodiment can likewise be carried out even when a sensor shift method of moving an image sensor is used.

An optical system 100 includes a shift lens 113. The shift lens 113 is movable in directions (orthogonal directions or rotational directions whose rotation centers are on the optical axis) non-parallel to the optical axis O of the optical system 100, which mitigates image shake due to translational direction components of a motion (shake) of the apparatus. An image sensor 101 converts, into image signals, an optical image formed through the optical system 100. A developing unit 102 performs, on image signals from the image sensor 101, development processes such as an A/D conversion, a white balance adjustment, a color (brightness/color difference signal) conversion, and a γ correction. A memory 103 stores image signals that have been subjected to development processes by the developing unit 102. Hereinafter, an area represented by image signals stored in the memory 103 is defined as an imaging area in the present embodiment. An imaging area corresponds to the entire captured image.

The present embodiment is based on the assumption that image shake due to rotational direction components of a motion (shake) of an apparatus is corrected by applying a geometric deformation process to an image. Therefore, the imaging area is larger than an image area serving as an object of geometric deformation processing or an image area to be output (hereinafter, collectively referred to as an output image area).

A memory controller 104 reads image signals stored in the memory 103 in accordance with an address that is input, and inputs the image signals to a geometric deformation processing unit 105. The memory controller 104 provides the memory 103 with, for example, addresses for reading image signals from a pixel at the left end to a pixel at the right end in order from the uppermost (upper end) line of an image area to be read.

The geometric deformation processing unit 105 subjects a captured image to a geometric deformation process using an amount of geometric deformation from a geometric deformation amount computation unit 110 described below. The image area necessary for geometric deformation processing is defined as a "reference area" in the present embodiment.

A system control unit 106 controls the entire operation of the digital camera, which includes the focal length, aperture value, and focus distance of the optical system 100, the drive of the shift lens, and the control of a system for driving the image sensor 101. Particularly, when controlling the driving of the shift lens 113, the amount of drive of the shift lens 113 is determined by adding an amount of shift lens offset obtained from an adjustment amount computation unit 112 to an amount of correction of translational direction components determined from an angular velocity obtained from a shake detection unit 107.

The shake detection unit 107 detecting information related to the motion of the digital camera is, for example, an angular velocity sensor. The shake detection unit 107 detects angular velocities (shake information) around (pitch, yaw, and roll) three axes (X, Y, and Z) caused by the motion of the digital camera. Then, the shake detection unit 107 outputs the detected shake information as motion information to a geometric deformation parameter generation unit 108 and the system control unit 106.

Here, if shake angles in the yaw direction, pitch direction, and roll direction of the camera are defined as α, β, and γ, respectively, and the focal length of the optical system is defined as f, then amounts of translational movement tx and ty, a rotation angle θ, and amounts of tilt vx and vy can be determined as follows:

$$tx = f(\tan \alpha \cos \gamma / \cos \beta + \tan \beta \sin \gamma)$$

$$ty = f(-\tan \alpha \sin \gamma / \cos \beta + \tan \beta \cos \gamma)$$

$$\theta = -\gamma$$

$$vx = -\tan \alpha / f$$

$$vy = -\tan \beta / (f \cos \alpha)$$

The shake angles α, β, and γ can be obtained by integrating the angular velocities of a shake obtained from the shake detection unit 107.

Therefore, the system control unit 106 can determine the amount of image shake correction (the amount of drive of and the drive direction of the shift lens 113) to correct the amounts of translational movement tx and ty from angular velocities of a shake obtained from the shake detection unit 107. The amount of correction of translational direction components may be determined from an acceleration sensor, a motion vector, or a velocity applied to the shift lens or an image sensor serving as an optical image shake correction member.

The geometric deformation parameter generation unit 108 generates geometric deformation parameters to correct a distortion of a captured image due to rotational direction components (the above-described rotation angle θ, and amounts of tilt vx and vy) of a shake from shake information (angular velocities) from the shake detection unit 107. Then, the geometric deformation parameter generation unit 108 outputs the geometric deformation parameters to a geometric deformation parameter adjustment unit 109. Geometric deformation parameters define geometric deformation processes, e.g., a resizing and cut-out process, and a projection conversion process in the present embodiment. The geometric deformation parameter generation unit 108 generates parameters for each kind of geometric deformation process so as to correct a distortion of a captured image due to rotational direction components of a shake by combinations of a plurality of geometric deformation processes that the geometric deformation processing unit 105 can execute. As described below, the geometric deformation processing unit 105 according to the present embodiment can execute a resizing and cut-out process, and a projection conversion process.

The geometric deformation parameter adjustment unit 109 adjusts geometric deformation parameters from the geometric deformation parameter generation unit 108 so as to decrease the amount of geometric deformation, based on an amount of adjustment from the adjustment amount computation unit 112, and outputs the adjusted parameters to a geometric deformation amount computation unit 110. Specific adjustment methods used in the geometric deformation parameter adjustment unit 109 will be described below.

The geometric deformation amount computation unit 110 computes the amount of geometric deformation from the geometric deformation parameters from the geometric deformation parameter adjustment unit 109, and outputs the amount of geometric deformation to the geometric deformation processing unit 105 and a reference area computation unit 111.

The reference area computation unit 111 generates first reference area addresses indicating a reference area using an amount of geometric deformation from the geometric deformation amount computation unit 110, and outputs the first reference area addresses to the adjustment amount computation unit 112. The reference area is an image area necessary for geometric deformation processing in the case of an optical image shake correction without taking a geometric deformation process into account.

The adjustment amount computation unit 112 generates, by using the first reference area addresses from the reference area computation unit 111, second reference area addresses indicating a reference area (an image area necessary for geometric deformation processing when taking an amount of offset of the shift lens into account) in which an amount of geometric deformation is taken into account. The adjustment amount computation unit 112 outputs the second reference area addresses to the memory controller 104. In addition, the adjustment amount computation unit 112 generates an amount of offset (an amount to be moved) of the shift lens 113 in which an amount of geometric deformation is taken into account, and outputs the amount of offset to the system control unit 106.

First, the details of geometric deformation processing in the geometric deformation processing unit 105 will be described using FIGS. 2A through 2C. The amount of geometric deformation corresponds to amounts of phase shift obtained by separating an amount of geometric deformation in a pixel position of interest as phase shift components in the horizontal and vertical directions.

Figure 2B:
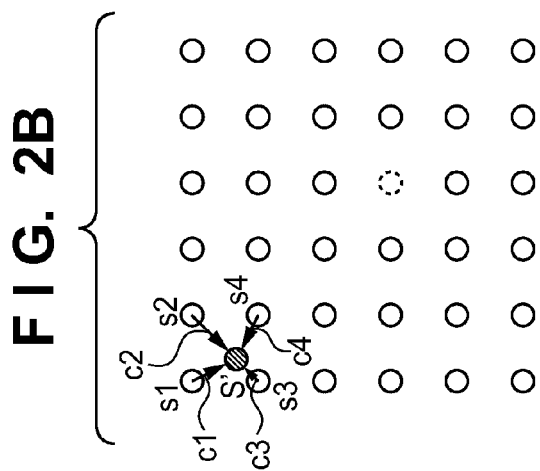
Figure 2C:
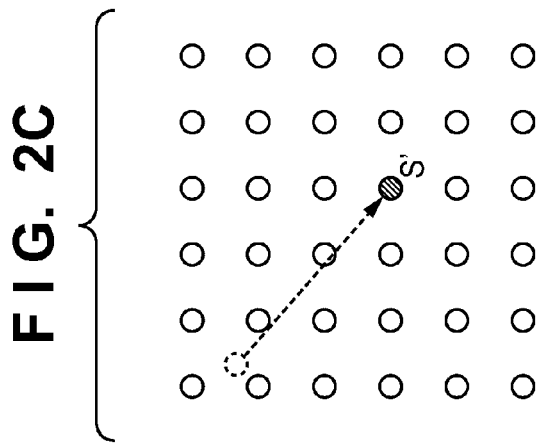

A black pixel in FIG. 2A represents a phase in which a pixel S of interest should actually be located. A virtual pixel S' represents a position of the pixel S of interest in the case where an image is captured with the pixel S phase-shifted by Hp in the horizontal direction and Vp in the vertical direction due to the effect of a shake. In order to correct a shake by geometric deformation processing, the value of the virtual pixel S' may be determined to replace the value of the pixel S of interest. As shown in FIG. 2B, the value of the virtual pixel S' may be generated by performing, by using the values of pixels s1, s2, s3, and s4 located in the neighborhood of the virtual pixel S', a weighting interpolation calculation with distances c1, c2, c3, and c4 between the pixels s1, s2, s3, and s4 and the virtual pixel S'. As shown in FIG. 2C, the value of the pixel S of interest is replaced by the generated value of the virtual pixel S', and thus, the geometric deformation processing of the pixel S of interest ends.

Figure 3:
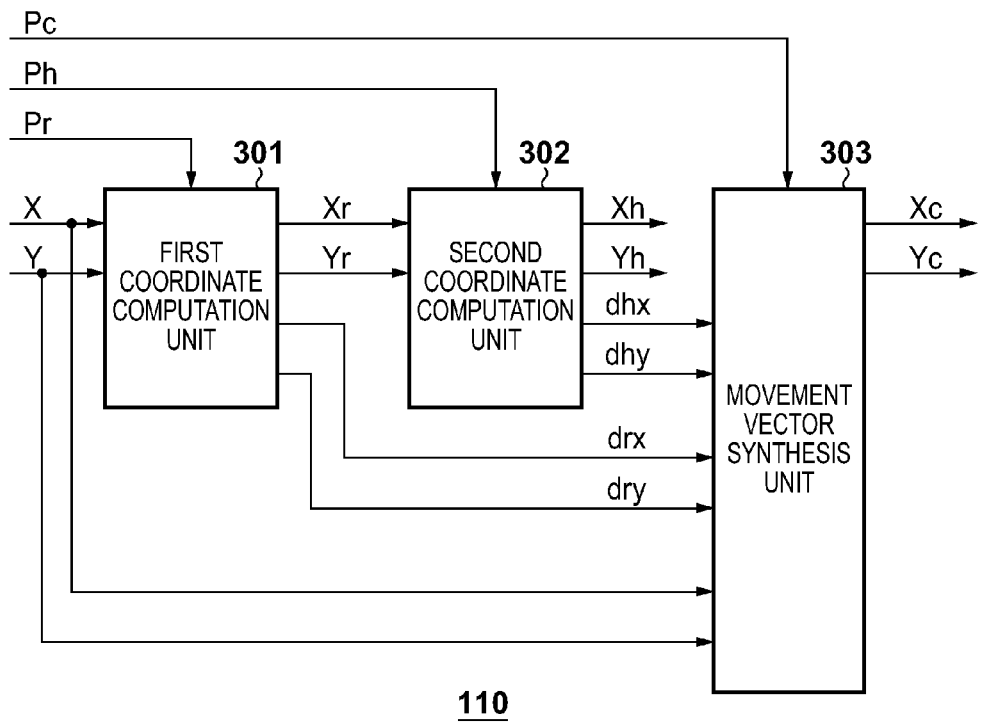
FIG. 3 is a block diagram showing a configuration example of the geometric deformation amount computation unit in FIG. 1.

Next, the details of the geometric deformation amount computation unit 110 will be described with reference to FIG. 3.

The geometric deformation amount computation unit 110 synthesizes, into one coordinate conversion, coordinate conversions due to a plurality of geometric deformation processes, and generates the resultant as phase shift components in the horizontal and vertical directions.

The geometric deformation amount computation unit 110 is configured with a first coordinate computation unit 301 and a second coordinate computation unit 302 that correspond to a plurality of geometric deformation components, and a coordinate movement vector synthesis unit 303. The first and second coordinate computation units 301 and 302 compute coordinate movement vectors and coordinates after geometric deformation processing from the geometric deformation parameters input from the geometric deformation parameter adjustment unit 109 and the coordinates before geometric deformation processing.

The first coordinate computation unit 301 computes coordinates realizing a resizing and cut-out process serving as a geometric deformation process. The second coordinate computation unit 302 computes coordinates realizing a projection conversion serving as a geometric deformation process.

The first coordinate computation unit 301 computes a coordinate movement vector (drx, dry) representing a resizing and cut-out process, and coordinates (Xr, Yr) after resizing and cut-out processing, from coordinates (X, Y) before geometric deformation processing, and a resizing and cut-out process parameter Pr.

If the geometric deformation parameter Pr is made up of an inverse r of a variable magnification factor, a conversion center (X0r, Y0r), and a translational movement (c, d), the coordinate movement vector (drx, dry) and coordinates (Xr, Yr) after processing are computed by the following calculation formulae.

$$\begin{bmatrix} X'r \\ Y'r \end{bmatrix} = \begin{bmatrix} r & 0 \\ 0 & r \end{bmatrix} \begin{bmatrix} X - X0r \\ Y - Y0r \end{bmatrix} + \begin{bmatrix} c \\ d \end{bmatrix} + \begin{bmatrix} X0r \\ Y0r \end{bmatrix} \quad \text{(Formula 1)}$$

$$\begin{bmatrix} drx \\ dry \end{bmatrix} = \begin{bmatrix} X'r - X \\ Y'r - Y \end{bmatrix} \quad \text{(Formula 2)}$$

$$\begin{bmatrix} X'r \\ Y'r \end{bmatrix} \rightarrow \begin{bmatrix} Xr \\ Yr \end{bmatrix} \quad \text{(Formula 3)}$$

The second coordinate computation unit 302 computes a coordinate movement vector (dhx, dhy) representing a projection conversion, and coordinates (Xh, Yh) after projection conversion, from the coordinates (Xr, Yr) after geometric deformation processing by the first coordinate computation unit 301 and a projection conversion parameter Ph.

If the geometric deformation parameter Ph is made up of a projection conversion matrix H and a conversion center (X0h, Y0h), the coordinate movement vector (dhx, dhy) and coordinates (Xh, Yh) after processing are computed by the following calculation formulae.

$$\begin{bmatrix} X'h \\ Y'h \\ m \end{bmatrix} = H \begin{bmatrix} Xr - X0h \\ Yr - Y0h \\ 1 \end{bmatrix} \quad \text{(Formula 4)}$$

$$\begin{bmatrix} X''h \\ Y''h \end{bmatrix} = \begin{bmatrix} X'h/m \\ Y'h/m \end{bmatrix} + \begin{bmatrix} X0h \\ Y0h \\ 0 \end{bmatrix} \quad \text{(Formula 5)}$$

$$\begin{bmatrix} dhx \\ dhy \end{bmatrix} = \begin{bmatrix} X''h - Xr \\ Y''h - Yr \end{bmatrix} \quad \text{(Formula 6)}$$

$$\begin{bmatrix} X''h \\ Y''h \end{bmatrix} \rightarrow \begin{bmatrix} Xh \\ Yh \end{bmatrix} \quad \text{(Formula 7)}$$

If rotational direction components of a shake are the above-described rotation angle θ, and amounts of tilt vx and vy, the projection conversion matrix H is represented, as the product of a projection conversion matrix H1 for correcting a rotation of an image and a projection conversion matrix H2 for correcting a tilt of the image, as follows:

$$H1 = \begin{bmatrix} \cos\theta & -\sin\theta & 0 \\ \sin\theta & \cos\theta & 0 \\ 0 & 0 & 1 \end{bmatrix} \quad \text{(Formula 8)}$$

$$H2 = \begin{bmatrix} 1 & 0 & 0 \\ 0 & 1 & 0 \\ vx & vy & 1 \end{bmatrix} \quad \text{(Formula 9)}$$

$$H = H1H2 = \begin{bmatrix} \cos\theta & -\sin\theta & 0 \\ \sin\theta & \cos\theta & 0 \\ vx & vy & 1 \end{bmatrix} \quad \text{(Formula 10)}$$

Finally, in the coordinate movement vector synthesis unit 303, the coordinates (X, Y) before geometric deformation processing, and the coordinate movement vectors (drx, dry) and (dhx, dhy) computed in the first and second coordinate computation units 301 and 302 are weighted and synthesized in accordance with a geometric deformation parameter Pc. If the geometric deformation parameter Pc is represented by synthesis weights ax, bx, ay, and by, a synthesis coordinate movement vector (dcx, dcy) and coordinates (Xc, Yc) after geometric deformation processing are computed by the following calculation formulae.

$$\begin{bmatrix} dcx \\ dcy \end{bmatrix} = \begin{bmatrix} ax & bx \\ ay & by \end{bmatrix} \begin{bmatrix} drx & dry \\ dhx & dhy \end{bmatrix} \quad \text{(Formula 11)}$$

$$\begin{bmatrix} Xc \\ Yc \end{bmatrix} = \begin{bmatrix} X \\ Y \end{bmatrix} + \begin{bmatrix} dcx \\ dcy \end{bmatrix} \quad \text{(Formula 12)}$$

Next, an operation of the reference area computation unit 111 will be described with reference to FIG. 4.

The reference area computation unit 111 computes the coordinates (Xc, Yc) after geometric deformation processing, relative to position information about an image output area, specifically, the coordinates (X, Y) of individual pixels included in the image output area, and can thereby compute a reference area.

Figure 4:
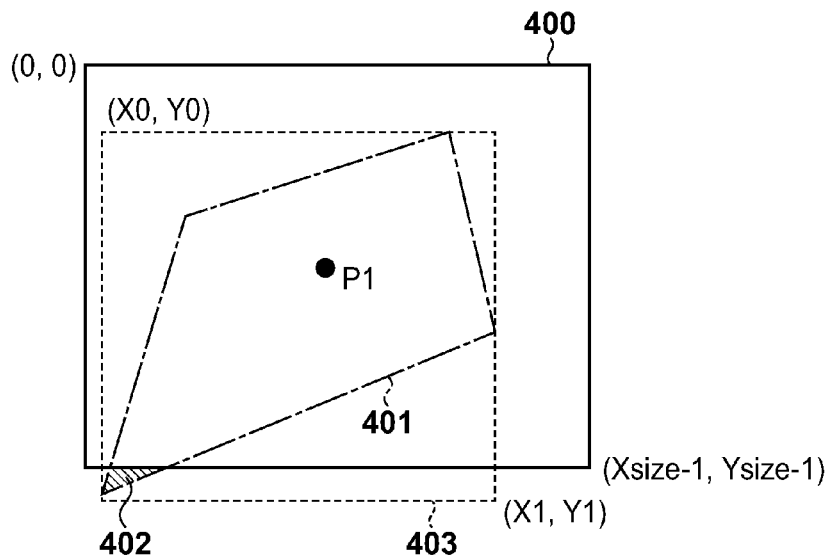
FIG. 4 is a schematic view illustrating an operation of a reference area computation unit in FIG. 1.

In FIG. 4, an imaging area 400 is the entire captured image held in the memory 103. A reference area 401 is an area necessary for geometric deformation processing for correcting rotational direction components of a shake. Furthermore, an area 402 is an area within the reference area 401 that is not included in the imaging area 400. A rectangular area 403 is a circumscribed rectangular area serving as one example of a rectangular area corresponding to the reference area 401.

In addition, Xsize and Ysize, respectively represent the horizontal size and vertical size of the imaging area 400. X0, Y0, X1, and Y1 are coordinates of the top left vertex and the bottom right vertex of the rectangular area 403 circumscribing the reference area 401, and represent first reference area addresses in the memory 103. The first reference area addresses are addresses representing a reference area (first reference area) in the case of an optical image shake correction without taking a geometric deformation process into account.

X0, Y0, X1, and Y1, respectively are obtained from the coordinate of the left end, the coordinate of the top end, the coordinate of the right end, and the coordinate of the bottom end, of the coordinates of each vertex, by computing the coordinates of four sides of the reference area 401. The coordinate values of the four sides of the reference area 401 may be computed, for example, by applying the above-described geometric deformation process to coordinates of four sides of an output image area.

The reference area computation unit 111 outputs, to the adjustment amount computation unit 112, X0, Y0, X1, and Y1 representing the first reference area thus computed.

Next, a configuration and an operation of the adjustment amount computation unit 112 that is a feature of the present embodiment will be described with reference to FIGS. 5 through 8B.

Figure 5:
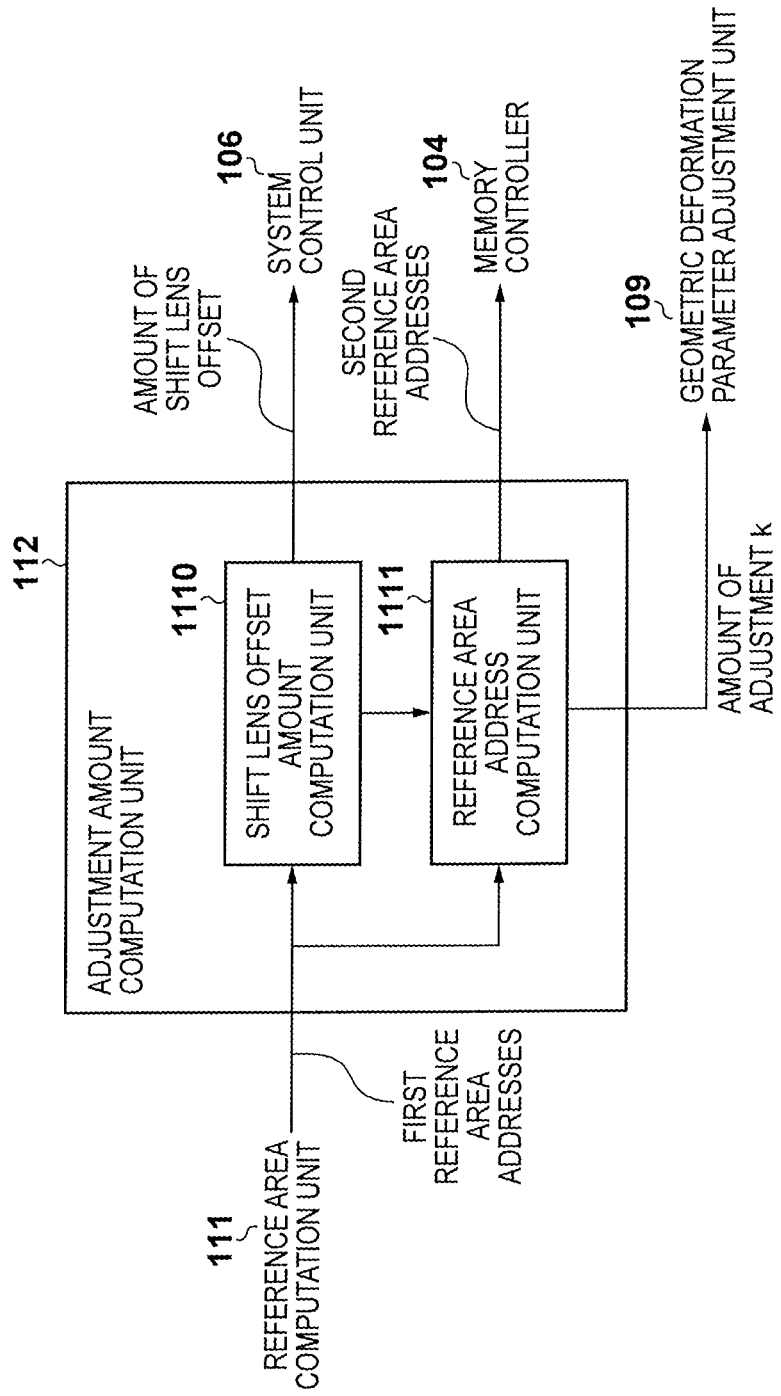
FIG. 5 is a block diagram showing a configuration example of an adjustment amount computation unit in FIG. 1.

FIG. 5 is a block diagram showing a functional configuration example of the adjustment amount computation unit 112. The adjustment amount computation unit 112 includes a shift lens offset amount computation unit 1110 and a reference area address computation unit 1111.

Figure 6:
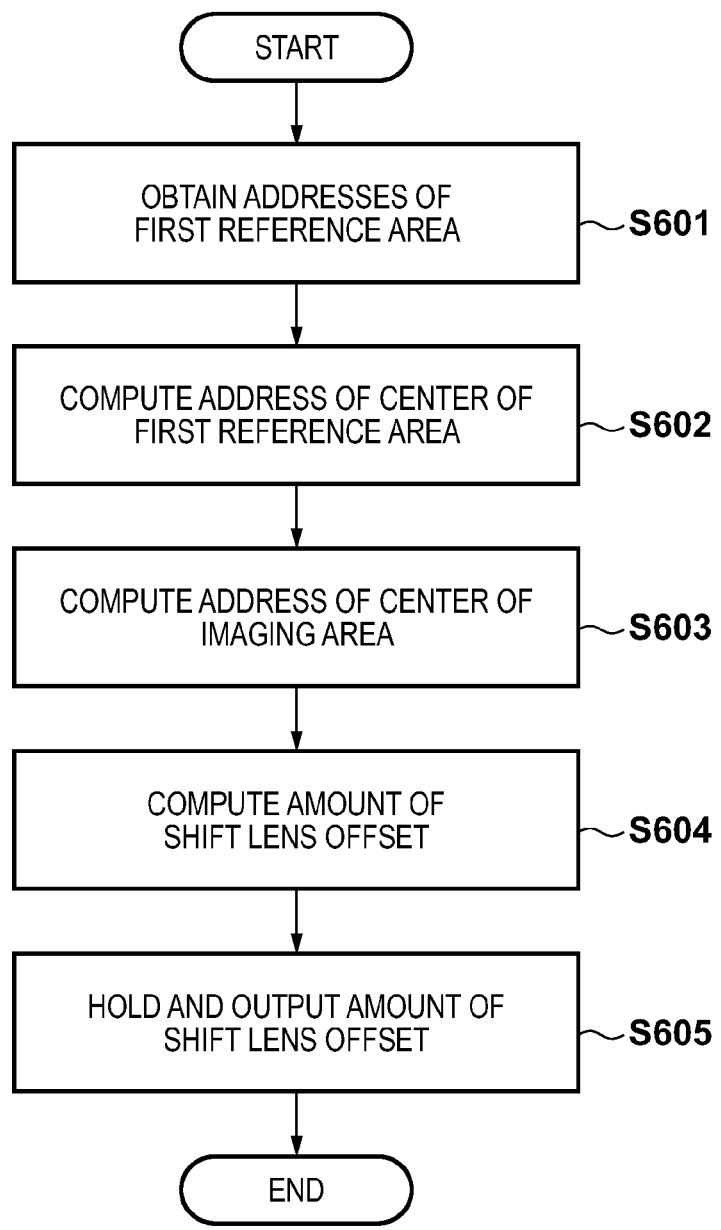
FIG. 6 is a flowchart illustrating an operation of a shift lens offset amount computation unit in FIG. 5.

Next, an operation of the shift lens offset amount computation unit 1110 will be described with reference to the flowchart in FIG. 6 and FIGS. 8A and 8B.

FIG. 8A is a view obtained by extracting the imaging area 400 and the rectangular area (the first reference area) 403 in FIG. 4. Each variable will be described below. Furthermore, FIG. 8B is a view showing a reference area (second reference area) generated by the reference area address computation unit 1111 in the case of an optical image shake correction in which a geometric deformation process is taken into account.

First, in S601, the shift lens offset amount calculation unit 1110 obtains first reference area addresses (addresses representing a reference area in the case of an optical image shake correction without taking a geometric deformation process into account) from the reference area computation unit 111. Next, in S602, the shift lens offset amount computation unit 1110 computes an address of the center of the first reference area (the rectangular area 403) shown in FIG. 8A by using, for example, the following calculation formulae.

$$REF1\_HCENT = (X1 - X0)/2 \quad \text{(Formula 13)}$$

$$REF1\_VCENT = (Y1 - Y0)/2 \quad \text{(Formula 14)}$$

In S603, the shift lens offset amount computation unit 1110 computes an address of the center (MEM_HCENT, MEM_VCENT) of the imaging area 400 shown in FIG. 8A by using, for example, the following calculation formulae.

$$MEM\_HCENT = Xsize/2 \quad \text{(Formula 15)}$$

$$MEM\_VCETN = Ysize/2 \quad \text{(Formula 16)}$$

As mentioned above, conventional optical image shake corrections have moved optical members such as a shift lens and an image sensor so that the positional relationship between the imaging area 400 and an object image is not shifted due to a shake. Therefore, there were cases where a reference area cannot effectively utilize an imaging area when applying a geometric deformation process after optical image shake correction. Thus, there were cases where the amount of correction due to geometric deformation processing is limited or a part is missing in the image after geometric deformation processing.

Therefore, in the present embodiment, by performing an optical image shake correction in which a geometric deformation process to be applied (or image shake to be corrected by geometric deformation processing) is taken into account, it is possible to effectively carry out a correction by geometric deformation processing.

Specifically, the amount of offset is computed that compensates a difference between the center of the rectangular area 403 circumscribing a reference area necessary for geometric deformation processing and the center of the imaging area 400. Then, the angle of view is changed by driving the shift lens 113 by the amount of offset.

Specifically, in S604, the shift lens offset amount computation unit 1110 computes an amount of shift lens offset by using, for example, the following calculation formulae.

$$HS\_OFST = MEM\_HCENT - REF1\_HCENT \quad \text{(Formula 17)}$$

$$VS\_OFST = MEM\_VCENT - REF1\_VCENT \quad \text{(Formula 18)}$$

In S605, the shift lens offset amount computation unit 1110 holds the amount of shift lens offset computed in S604, and in addition outputs the amount of shift lens offset to the system control unit 106.

The system control unit 106 drives the shift lens 113 by applying the amount of shift lens offset to an amount of shift lens drive for correcting translational direction components of a shake computed based on an output of the shake detection unit 107. Because of this, it is possible to realize an optical image shake correction such that the center of the rectangular area 403 is brought into the center of the imaging area 400.

It is possible to obtain the greatest effect when the center of the rectangular area 403 coincides with the center of the imaging area 400. However, as long as the shift lens 113 is driven so that the center of the rectangular area 403 comes closer to the center of the imaging area than a case where a geometric deformation process is not taken into account, some effect is obtained. That is, an amount of offset may be computed such that a difference between the center of the rectangular area 403 and the center of the imaging area 400 is reduced. As described above, the optical member driven in optical image shake correction is not limited to the shift lens 113, and may also be, for example, the image sensor 101. In addition, a plurality of optical members may be driven.

Figure 7:
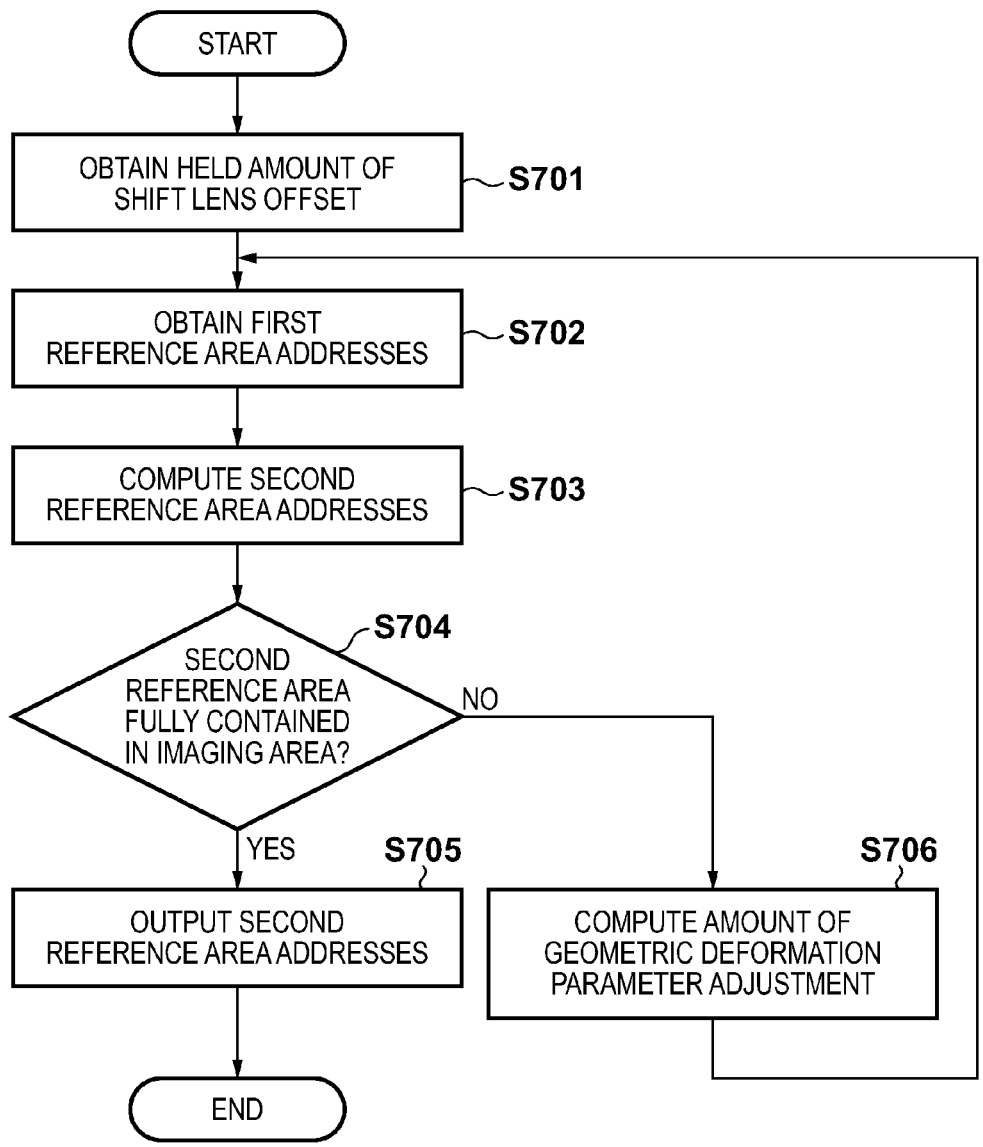
FIG. 7 is a flowchart illustrating an operation of a reference area address computation unit in FIG. 5.
Figure 8:
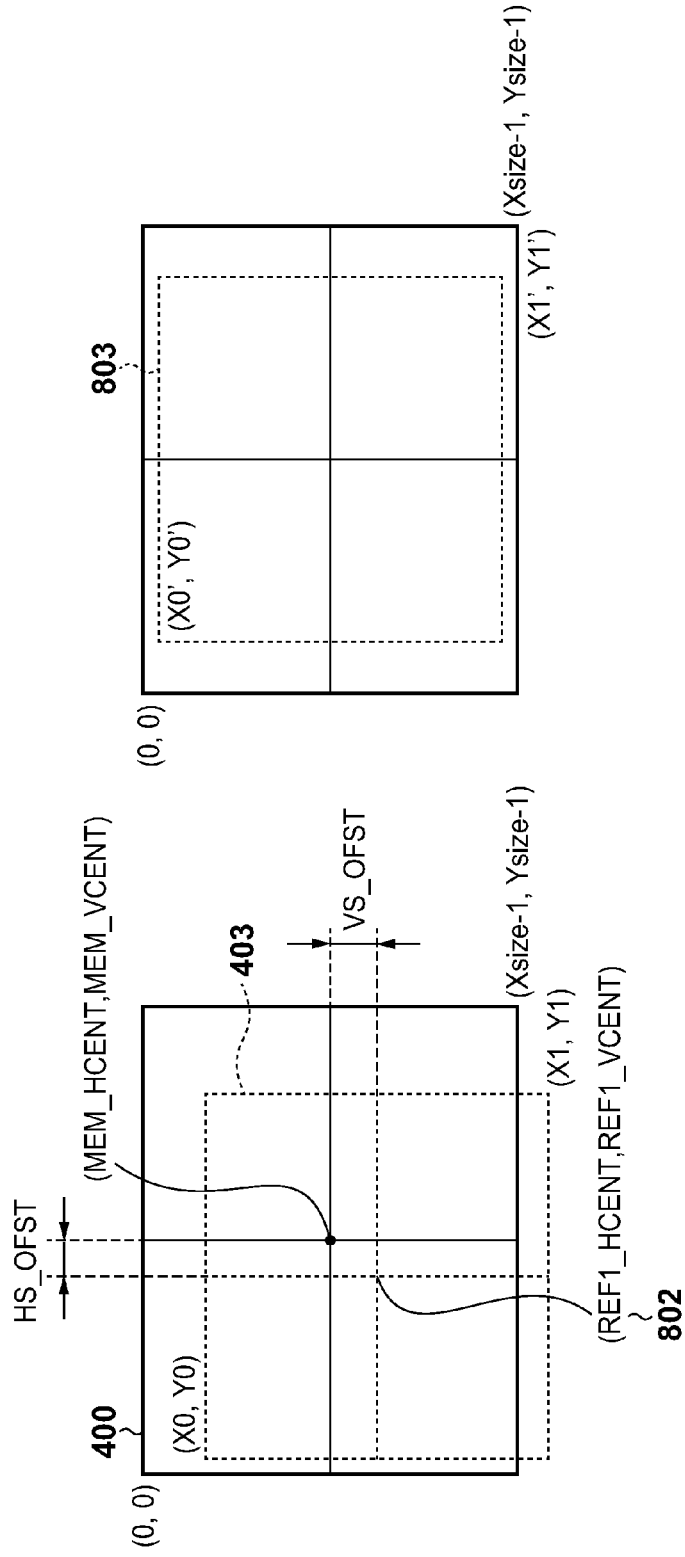
FIGS. 8A and 8B are schematic views illustrating the operations of the shift lens offset amount computation unit and the reference area address computation unit in FIG. 5.

Next, an operation of the reference area address computation unit 1111 will be described with reference to a flowchart in FIG. 7 and FIGS. 8A and 8B.

When the shift lens 113 to be subjected to an optical image shake correction is driven in synchronization with vertical synchronization signals of an image output by the image sensor 101, a reference area to be read from the memory 103 is moved in parallel by a shift lens offset before one vertical synchronization time (1V) so as to be captured. Therefore, the reference area is read from a position obtained by adding an amount of shift lens offset before 1V to first reference area addresses to be read.

In S701, the reference area address computation unit 1111 reads an amount of shift lens offset before 1V that is held in the shift lens offset amount computation unit 1110.

In S702, the reference area address computation unit 1111 obtains the first reference area addresses (X0, Y0, X1, Y1) from the reference area computation unit 111. Then, in S703, the reference area address computation unit 1111 computes second reference area addresses (X0', Y0', X1', Y1') from the first reference area addresses and the amount of shift lens offset by using, for example, the following calculation formulae. As shown in FIG. 8B, the second reference area addresses are addresses representing a reference area 803 in which an amount of offset of the shift lens is taken into account.

$$X0' = X0 + HS\_OFST \quad \text{(Formula 19)}$$

$$Y0' = Y0 + VS\_OFST \quad \text{(Formula 20)}$$

$$X1' = X1 + HS\_OFST \quad \text{(Formula 21)}$$

$$Y1' = Y1 + VS\_OFST \quad \text{(Formula 22)}$$

In S704, the reference area address computation unit 1111 determines whether a second reference area represented by the second reference area addresses is fully contained in the imaging area. If it is determined that it is fully contained in the imaging area, the process advances to S705, and if it is determined that it is not fully contained in (extends beyond) the imaging area, the process advances to S706.

In S705, the reference area address computation unit 1111 outputs the second reference area addresses to the memory controller 104. The memory controller 104 reads images of the second reference area in turn from the memory 103 based on the second reference area addresses, and supplies the images to the geometric deformation processing unit 105.

On the other hand, when the second reference area is not fully contained in the imaging area, if geometric deformation is performed as it is, a part of an image after geometric deformation is missing. The reason why the second reference area is not fully contained in the imaging area is because the amount of geometric deformation is large. Therefore, in S706, the reference area address computation unit 1111 computes an amount k of adjustment to decrease the amount of geometric deformation, and outputs the amount k of adjustment to the geometric deformation parameter adjustment unit 109.

The geometric deformation parameter adjustment unit 109 applies the amount k of adjustment as described below, for example, to geometric deformation parameters Pr, Ph, and Pc from the geometric deformation parameter generation unit 108, and decreases the amount of geometric deformation. In this case, the amount k of adjustment has a value of 0<k<1.

$$Pr'=k*Pr \qquad \text{(Formula 23)}$$

$$Ph'=k*Ph \qquad \text{(Formula 24)}$$

$$Pc'=k*Pc \qquad \text{(Formula 25)}$$

The geometric deformation amount computation unit 110 and the reference area computation unit 111 recalculate an amount of geometric deformation and first reference area addresses based on geometric deformation parameters after adjustment. In the process from S702 to be executed after the process is returned from S706, the recalculated first reference area addresses are used.

Since reduction in the amount of geometric deformation is reduction in the amount of correction of rotational direction components of a shake by geometric deformation processing, it is preferred that the amount of reduction is reduced. Therefore, in the present embodiment, the value of the amount k of adjustment is changed stepwise so that the amount of reduction becomes gradually larger. For example, if the amount k of adjustment is a coefficient as in the above-described, for example, the amount k of adjustment is gradually changed into lower values.

Specifically, while changing the amount k of adjustment until second reference area addresses are obtained that does not extend beyond the imaging area, the operation of adjustment of the geometric deformation parameters, and recalculation of an amount of geometric deformation and first reference area addresses, based on geometric deformation parameters after adjustment is repeatedly executed. It becomes possible to compute reference area addresses that do not extend beyond the imaging area while suppressing the amount of reduction by setting the amount k of adjustment so as to gradually increase the amount of reduction in accordance with the number of repetitions.

As described above, according to the present embodiment, in an image capture apparatus correcting image shake due to a motion of the image capture apparatus by combining an optical image shake correction and a geometric deformation process, the amount of drive of an optical member in optical image shake correction is set to a value in which a geometric deformation process is taken into account. Specifically, an optical member is driven so that the center of a rectangular area corresponding to a reference area necessary for geometric deformation processing comes closer to the center of an imaging area than in a case where a geometric deformation process is not taken into account. Therefore, it is possible to increase a possibility that a reference area is fully contained in an imaging area, and it becomes possible to effectively perform a correction due to a geometric deformation process while suppressing the missing of parts in the corrected image.

(Second Embodiment)

Figure 9:
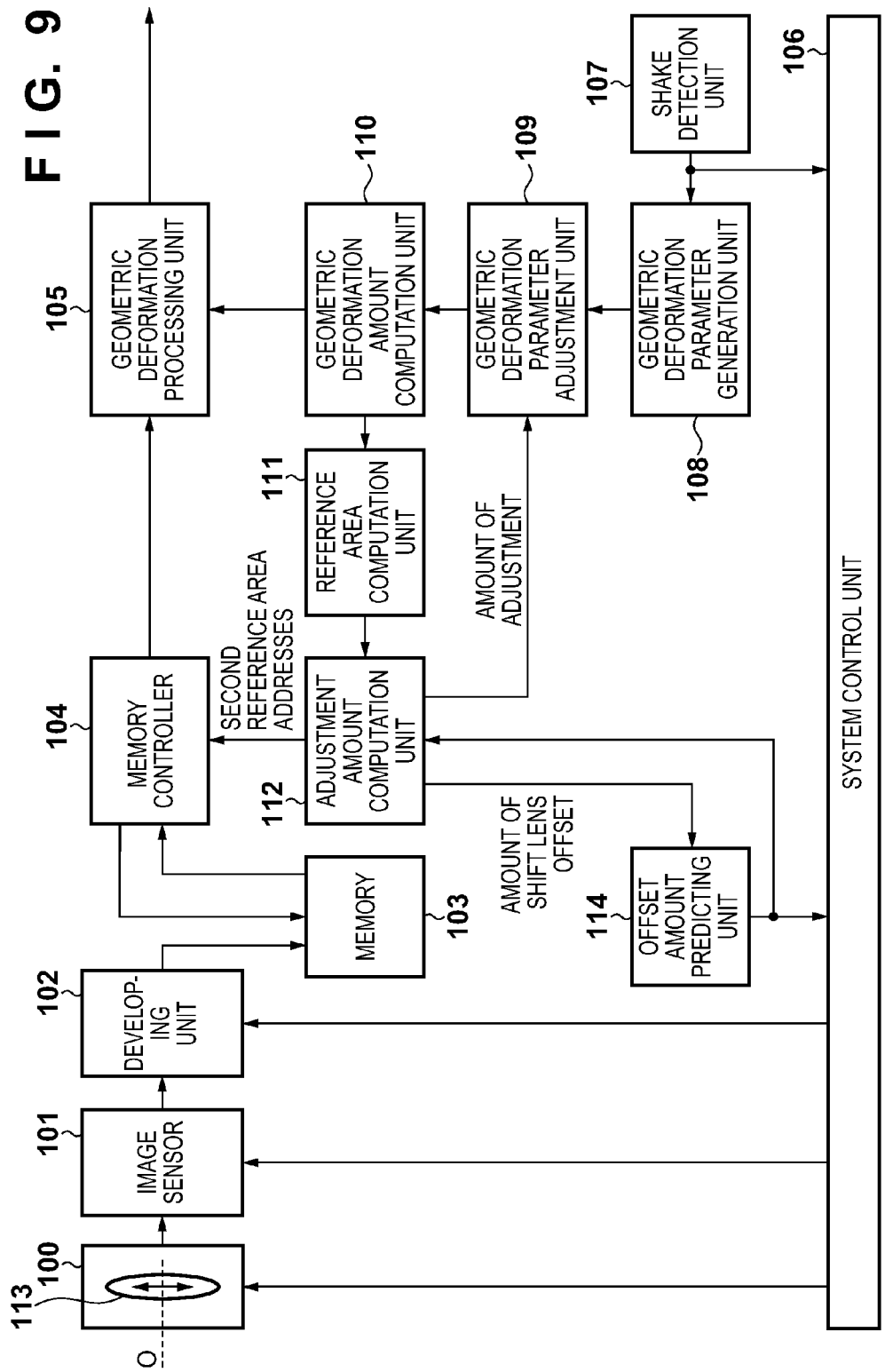
FIG. 9 is a block diagram showing a functional configuration example of a digital camera serving as one example of an image processing apparatus according to a second embodiment of the present invention.

FIG. 9 is a block diagram showing a functional configuration example of a digital camera serving as one example of an image capture apparatus according to a second embodiment of the present invention. In FIG. 9, function blocks that are identical with function blocks in FIG. 1 are marked with identical reference numerals, and the duplicate description is omitted. As can be seen by comparing FIG. 9 with FIG. 1, a digital camera according to the present embodiment is different from that according to the first embodiment in that the digital camera includes an offset amount predicting unit 114 predicting the amount of shift lens offset.

Hereinafter, parts different from the first embodiment about a configuration and an operation of a digital camera according to the present embodiment will be mainly described.

Angular velocity information from the shake detection unit 107 corresponds to time at which an image to be subjected to a geometric deformation process is captured, and the amount of shift lens offset computed from this angular velocity information also corresponds to the time at which the image indicating a desire to apply a geometric deformation process is captured.

That is, the amount of shift lens offset applied to an image to be captured is an amount corresponding to a shake before one vertical synchronization time (1V). Therefore, if the amount of shake of the digital camera becomes sharply larger, the difference between the amount of shift lens offset before 1V and an actually necessary amount of shift lens offset becomes larger, and there may be a possibility that a reference area is not fully contained in an imaging area.

Therefore, in the present embodiment, the offset amount predicting unit 114 is added that predicts the amount of shift lens offset after the next vertical synchronization time from an amount of shift lens offset computed by the adjustment amount computation unit 112, and the offset amount predicting unit 114 outputs a predicted value to the system control unit 106 and the adjustment amount computation unit 112.

Figure 10:
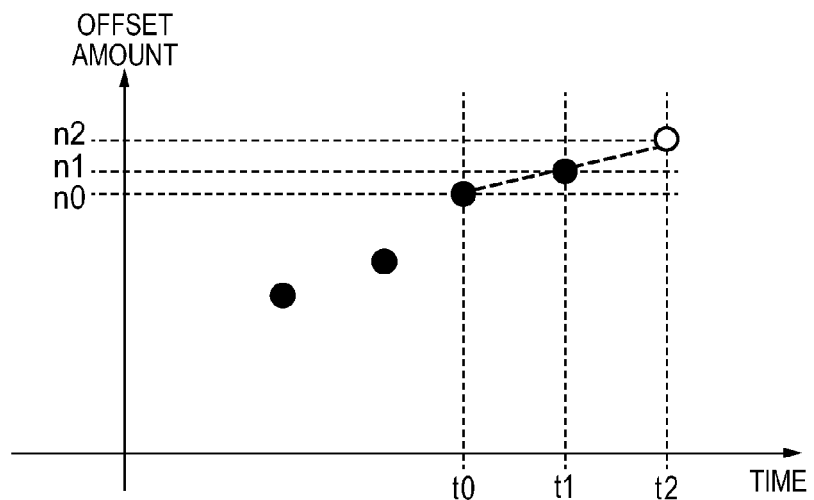
FIG. 10 is a schematic view illustrating an operation of an offset amount predicting unit in FIG. 9.
Figure 11A:
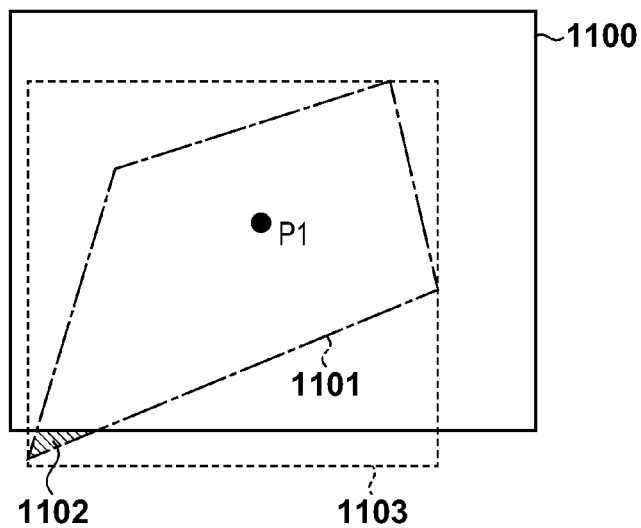
FIGS. 11A and 11B are schematic views illustrating problems of the conventional art.
Figure 11B:
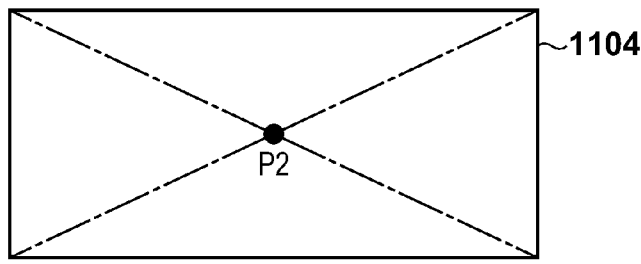

FIG. 10 is a view illustrating a prediction method used in the offset amount predicting unit 114.

t0, t1, and t2 represent time, t1 represents the current time, t0 represents time before 1V, and t2 represents time after 1V. In addition, n0, and n1 represent the amount of shift lens offset at time t0, and t1, respectively. n2 is a predicted value of the amount of shift lens offset at time t2 that is computed by using, for example, the following calculation formula.

$$n2 = \frac{n1-n0}{t1-t0}*t2+\left(n1-\frac{n1-n0}{t1-t0}*t1\right) \qquad \text{(Formula 26)}$$

In this way, the offset amount predicting unit 114 according to the present embodiment predicts the amount of shift lens offset at the time of capturing the next image (a vertical synchronization time) from the temporal variation of the amount of shift lens offset computed by the adjustment amount computation unit 112.

In the present embodiment, the system control unit 106 drives the shift lens using a predicted value of the amount of shift lens offset. In addition, the adjustment amount computation unit 112 outputs an amount of shift lens offset computed in the shift lens offset amount computation unit 1110 to the offset amount predicting unit 114. The amount of shift lens offset held in the shift lens offset amount computation unit 1110 is set to a predicted value (an actually used amount of offset) computed by the offset amount predicting unit 114.

As described above, according to the present embodiment, the offset amount of drive of an optical member used for an optical image shake correction in the first embodiment is set to a predicted value predicted from previously computed amounts of shift lens offset. Therefore, in addition to effects of the first embodiment, even in a case where the motion of an image capture apparatus changes considerably, it is possible to increase a possibility that a reference area is fully contained in an imaging area, and it becomes possible to further enhance the effect of suppressing a chip in the corrected image.

(Other Embodiments)

The above-described embodiments can be carried out not only in image capture apparatuses such as digital cameras and digital video cameras, but also in any device including an image capture apparatus, e.g., mobile phones, gaming machines, personal computers, personal digital assistants (PDAs), tablets, and the like.

In the second embodiment, a predicted value of the amount of offset was computed based on the temporal variation of previously computed amounts of offset. However, an amount of shake at the time of capturing the next image may be predicted from information about previous amounts of shake detected by the shake detection unit 107 so as to use an amount of offset corresponding to the amount of shake.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-30409, filed on Feb. 19, 2013, which is hereby incorporated by reference herein its entirety.

What is claimed is:

1. An image capture apparatus comprising:
   a detection unit which detects a motion in a translational direction and a rotational direction of the apparatus;
   a shake correction unit which mitigates image shake of a captured image due to the motion in the translational direction by driving an optical member; and
   a geometric deformation processing unit which corrects a distortion of the captured image due to a detected motion in the rotational direction by applying a geometric deformation process to the captured image,
   wherein the geometric deformation processing unit corrects the distortion in an output image area that is smaller than an imaging area of the captured image by applying to the output image area the geometric deformation process using pixels of a reference area of the captured image that is necessary to correct the distortion, and
   wherein the shake correction unit drives the optical member based on an amount of drive corrected so that a center of a rectangular area corresponding to the reference area comes closer to a center of the imaging area.

2. The image capture apparatus according to claim 1, further comprising:
   a geometric deformation parameter generation unit which generates geometric deformation parameters defining the geometric deformation process necessary to correct the distortion of the captured image from a detected motion in the rotational direction;
   a reference area computation unit which computes the reference area from the geometric deformation parameters and position information about the output image area; and
   an offset amount computation unit which computes an amount of offset that reduces a difference between the center of the rectangular area corresponding to the reference area and the center of the imaging area,
   wherein the shake correction unit drives the optical member by applying the amount of offset.

3. The image capture apparatus according to claim 2, further comprising:
   a geometric deformation parameter adjustment unit which adjusts the geometric deformation parameters so as to reduce an amount of geometric deformation due to the geometric deformation process,
   wherein if it is determined that the reference area is not fully contained in the imaging area, the geometric deformation parameter adjustment unit adjusts the geometric deformation parameters until it is determined that the reference area is fully contained in the imaging area.

4. The image capture apparatus according to claim 2, wherein the offset amount computation unit computes an amount of offset predicted based on a temporal variation of previously computed amounts of offset.

5. The image capture apparatus according to claim 1, wherein the optical member is a shift lens or an image sensor included in an optical system.

6. A method for controlling an image capture apparatus comprising:
   a detection step of detecting a motion in a translational direction and a rotational direction of the apparatus;
   a shake correction step of mitigating image shake of a captured image due to a motion in the translational direction by driving an optical member; and
   a geometric deformation processing step of correcting a distortion of the captured image due to a detected motion in the rotational direction by applying a geometric deformation process to the captured image,
   wherein in the geometric deformation processing step, the distortion in an output image area that is smaller than an imaging area of the captured image is corrected by applying to the output image area the geometric deformation process using pixels of a reference area necessary to correct the distortion, and wherein in the shake correction step, the optical member is driven based on an amount of drive corrected so that a center of a rectangular area corresponding to the reference area comes closer to a center of the imaging area.

* * * * *